United States Patent
Zhang et al.

(10) Patent No.: US 11,280,465 B2
(45) Date of Patent: Mar. 22, 2022

(54) ADB FUNCTION ADJUSTMENT METHOD AND VEHICLE LIGHT WITH ADB FUNCTION

(71) Applicant: HASCO VISION TECHNOLOGY CO., LTD., Shanghai (CN)

(72) Inventors: Jie Zhang, Shanghai (CN); Shikun Dong, Shanghai (CN); Fan Meng, Shanghai (CN); Feiquan Li, Shanghai (CN); Jiayuan Chen, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/259,793

(22) PCT Filed: May 27, 2019

(86) PCT No.: PCT/CN2019/088541
§ 371 (c)(1),
(2) Date: Jan. 12, 2021

(87) PCT Pub. No.: WO2020/010935
PCT Pub. Date: Jan. 16, 2020

(65) Prior Publication Data
US 2021/0341124 A1 Nov. 4, 2021

(30) Foreign Application Priority Data

Jul. 13, 2018 (CN) .......... 201810772558.X
Jul. 13, 2018 (CN) .......... 201821113797.6

(51) Int. Cl.
*F21S 41/64* (2018.01)
*F21S 41/141* (2018.01)
*B60Q 1/00* (2006.01)
*F21Y 115/10* (2016.01)
*F21W 102/20* (2018.01)

(52) U.S. Cl.
CPC .......... *F21S 41/645* (2018.01); *B60Q 1/0023* (2013.01); *F21S 41/141* (2018.01); *F21W 2102/20* (2018.01); *F21Y 2115/10* (2016.08)

(58) Field of Classification Search
CPC ........ F21S 41/645; F21S 41/141; F21S 41/65; F21S 41/657; B60Q 1/0023; F21Y 2115/10; F21W 2102/20; F21V 14/00; F21V 14/02
See application file for complete search history.

(56) References Cited

U.S. PATENT DOCUMENTS

| | | | |
|---|---|---|---|
| 10,156,334 B2 * | 12/2018 | Kikuchi | F21S 41/148 |
| 2007/0091629 A1 * | 4/2007 | Fukawa | B60Q 1/1415 |
| | | | 362/509 |
| 2016/0368414 A1 * | 12/2016 | Son | F21S 41/143 |
| 2018/0043820 A1 * | 2/2018 | Murakami | H05B 45/10 |

* cited by examiner

*Primary Examiner* — Bao Q Truong
(74) *Attorney, Agent, or Firm* — CBM Patent Consulting, LLC

(57) ABSTRACT

Disclosed are an ADB function adjustment method and a vehicle light, wherein a superposed illumination light shape is formed by a periodic high-speed change of a light shape; the periodic high-speed change of the light shape may be a shape change (dynamic superposition of light shapes) or a position change or a synchronous change in shape and position; and a light source is quickly switched off in conjunction with the periodic change of the light shape to generate one or more local dark areas, thereby realizing an adaptive driving beam function.

22 Claims, 10 Drawing Sheets

ADB FUNCTION ADJUSTMENT METHOD AND VEHICLE LIGHT WITH ADB FUNCTION

BACKGROUND OF THE INVENTION

1. Technical Field

The invention relates to vehicle lights, in particular to an adaptive driving beam (ADB) function adjustment method and a novel vehicle light system with an ADB function, which realize an ADB function of vehicle lights by a quick change and superposition of light shapes in conjunction with fast on-off control of a light source.

2. Description of Related Art

The continuing safety problem of night driving of vehicles has put forward higher requirements for the ADB technique of novel intelligent vehicle lights. The ADB technique of the novel intelligent vehicle lights aims to develop variable-light shape vehicle lights with an AFS function and the ADB function.

For example, when a vehicle light system adopting a headlight with the ADB function detects, in cooperation with a vehicle detection system, other road participators (such as cars or pedestrians in the same or opposite direction) within a certain illumination area of the headlight, the vehicle light system can intelligently adjust the illuminating brightness of this area to avoid dazzle light dangerous to those who are illuminated, and a high illuminating brightness can be maintained in spaces where there is no other road participator. In this way, high-quality illumination in front of our party (the driver of a vehicle provided with an LED adaptive headlight) is guaranteed, dazzle light dangerous to other road participators will not be formed, so that the night driving safety of both parties on the road is guaranteed.

In an ideal condition, the ADB function enables the intelligent headlights to form a dark area as small as the head of the opposite driver at different positions and maintain a high illuminating brightness in the other spaces without any target, so that the opposite driver will not be dazzled, and our party can illuminate any areas on the driving road to the maximum extent.

Generally, an ADB determines the road condition through a camera or other sensing equipment and then figures out a required dark area, so a light source is switched on or off according to the road condition. The realization of a local dark area is the basis of the ADB.

As one of existing solutions, the matrix headlight based on the MATRIX technique divides an illumination space of the whole headlight into different continuous blocks, which adopt different numbers of LEDs for illumination, such that a dark area as small as 1° can be provided by switching off the LEDs in specific blocks.

For example, Chinese Invention Patent Application No. 201210421033.4 discloses a headlight projection module, wherein as described in [0010], the configuration requirements of a main optical unit are associated with the angle range of a single local area formed on the lane by the projection of a light distribution along the sight of the driver. Thus, the imaging pixels should have an angle of only several degrees (such as 1°), and the vertical angle range of the imaging pixels is a bit larger. The light distribution can be precisely changed by operating one or more target LEDs of the front headlight module to realize, for example, a local driving beam or a sign beam. As for the local driving beam, an area, in which other traffic participators have been detected, in the light distribution region can be shielded by switching off a target LED. As for the sign beam, a detected target in front of a motor vehicle can be illuminated by activating a target LED to raise the attention from the driver of the motor vehicle.

For another example, Chinese Invention Patent Application No. 201410445932.7 discloses a projection optical device for use in an LED module of a motor vehicle headlight, wherein an LED module is provided with a light source in the form of an LED matrix, a primary optical device and a projection optical device body, wherein the LED matrix comprises multiple LED light-emitting chips which are parallelly arranged and/or stacked in the form of multiple matrixes; and the primary optical device comprises multiple primary optical elements which are parallelly arranged and/or stacked in the form of multiple matrixes and is used for condensing light emitted by a light source; and the projection optical device body is used to project an emergent surface of the primary optical device to the lane in front of the motor vehicle to generate a predetermined light distribution.

Chinese Invention Patent Application No. 201510036140.9 discloses a light module of a motor vehicle headlight. The light module comprises multiple semiconductor light sources, multiple primary optical units and a common secondary optical unit, wherein the semiconductor light sources are parallelly arranged and/or stacked in a matrix form, can be controlled separately, and are used to emit light; the primary optical units correspond to the semiconductor light sources, are parallelly arranged and/or stacked in a matrix form, and are used to collect light beams emitted by at least one part of the semiconductor light sources to generate a primary light distribution on the light output surface of the primary optical units; and the common secondary optical unit uses the primary light distribution as secondary light distribution to form an image on the lane in front of the motor vehicle to illuminate a front area by means of the secondary light distribution.

However, all the above patents realize a dark area required by the ADB function by means of static switching-off of LEDs (namely LED light-emitting chips) and have the following defects:

1. The number of imaging pixels is equal to the number of LED light-emitting chips, so that a large number of LEDs are required to realize a high resolution, a corresponding control circuit board is more complicated, the complexity and manufacturing difficulty of optical conductors of the primary optical units are greatly improved, and the cost is increased. In addition, due to the space limitation of the vehicle lights, the number of LED light-emitting chips used is limited, which leads to a limited number of pixels of the projection module.

2. Existing lights capable of realizing an adjustable illumination scope, including the matrix headlight, also have a common problem that the minimum angle of a dark area formed by the system is still too large. That is to say, although the dark area can prevent the driver of a target vehicle against dazzle light, the scope of the dark area substantially exceeds the width required by the target vehicle, which leads to an illumination loss of our party. For example, the matrix headlight mentioned above can provide a dark area as small as 1°. However, the actual transverse width of the dark area depends on the distance between the target vehicle and our party, for example, if the ADB is expected to come into effect 400 m away, the width of the dark area at this position is (400 m*tan 1°)=6.98 m, the actual width of the vehicle (such as a common passenger car) is about 1.9 m, and the dark area is obviously too large.

3. Existing vehicle light systems realize brightness adjustment by means of a static mode or by controlling the duty ratio, but there is no change in the light shape.

A special state of quick changes of light shapes is linear and transverse reciprocation of the light shape, and a dark area required by the ADB can be formed by quickly switching off each light shape at the same position in each movement cycle. Although quick changes of the light shapes and fast on-off control of the light source have been reported, the objective for realizing the dark area required by the ADB has not been reported yet.

BRIEF SUMMARY OF THE INVENTION

To solve the aforesaid problems, one objective of the invention is to provide an ADB function adjustment method and a novel vehicle light system with an ADB function, which realize an ADB function of vehicle lights by a quick change and superposition of light shapes in conjunction with fast on-off control of a light source.

Different from traditional static vehicle light functions, the invention realizes a vehicle light function by means of a superposed light shape formed by a dynamic and quick change of a light shape.

Another objective of the invention is to provide an ADB function adjustment method and a novel vehicle light system with an ADB function, which realize a large illumination area by means of a few LED light-emitting chips.

Another objective of the invention is to provide an ADB function adjustment method and a novel vehicle light system with an ADB function, which realize an ideal high-beam illumination light shape with the brightness becoming dark gradually from the center by means of light energy distribution control fulfilled by dynamic superposition of light shapes.

Another objective of the invention is to provide an ADB function adjustment method and a novel vehicle light system with an ADB function, which improve the ADB uniformity by means of a dynamic change and superposition of light shapes.

Another objective of the invention is to provide an ADB function adjustment method and a novel vehicle light system with an ADB function, which can realize a smaller dark area and significantly improve the control precision of an ADB, compared with an existing ADB function realized by multiple LED light-emitting chips arranged in a matrix and static switching-off.

Another objective of the invention is to provide an ADB function adjustment method and a novel vehicle light system with an ADB function, which can form a matrix light shape by means of joint control of multiple chips that are arranged in a matrix and are separately controlled to be switched on or off.

Another objective of the invention is to provide an ADB function adjustment method and a novel vehicle light system with an ADB function, which adopt multiple LED light-emitting chips that can be defocused forward or backward with respect to the focal point of a lens or a lens group to realize multi-dimensional ADB function adjustment, that is, ADB function control is carried out for upper, lower, left and right objects in front of a vehicle light by different distances.

The technical solution of the ADB function adjustment method is as follows:

The ADB function adjustment method is characterized in that a superposed illumination light shape is formed by a periodic high-speed change of a light shape, and the periodic high-speed change of the light shape may be a shape change, that is, dynamic superposition of light shapes, or a position change or a synchronous change in shape and position.

The ADB function adjustment method of the invention is characterized in that a light source is quickly switched off in conjunction with the periodic change of the light shape to generate one or more local dark areas, thereby realizing an ADB function.

The ADB function adjustment method of the invention is characterized in that Lambertian-like divergent light rays emitted by the LED light source are collimated by an optical lens and are then irradiated to form illumination light rays nearly in parallel, the illumination light rays form a primary light spot and a primary light shape thereof on a front vertical screen, and the primary light shape is a primary intensive light spot formed around the primary light spot;

The light source is transversely displaced with respect to the lens to form a secondary spot light and a continuous secondary light shape thereof;

A high-beam illumination light shape is formed by dynamic superposition of the primary light shape and the secondary light shape, wherein the dynamic superposition of the primary light shape and the secondary light shape includes superposition of shape changes or position changes of the light shapes.

FIG. 2-FIG. 4 and FIG. 6-FIG. 12 respectively illustrate two methods.

On this basis, the ADB function adjustment method for a vehicle light of the invention is characterized in that the light source is switched off when moving to a certain position in each cycle, and is in an on state in the other positions, such that a light shape having a dark area is formed on the front vertical screen corresponding to a switched-off position, thereby realizing the ADB function;

That is, a local dark area is formed by recombination of dynamically moving light shapes and fast on-off of the light source to realize the ADB function.

The ADB function adjustment method for a vehicle light of the invention is characterized in that the dark area includes a transitional dark area formed in the moving process of the light source and located between the primary light source and a dark area formed when the light source moves to the switched-off position, namely a low-brightness transitional area and a real dark area corresponding to the displacement of the light source.

The ADB function adjustment method for a vehicle light of the invention is characterized in that a secondary light distribution component is additionally disposed between the light source and the lens to change the primary light shape in shape and position.

The ADB function adjustment method for a vehicle light of the invention is characterized in that the light source quickly and linearly reciprocates in a transverse area to form a continuous illumination light shape.

The ADB function adjustment method for a vehicle light of the invention is characterized in that a rotary light source device is used to enable the light source to quickly and linearly reciprocate with respect to the lens.

The ADB function adjustment method for a vehicle light of the invention is characterized in that a rotary light source system includes a light source assembly composed of an LED light-emitting chip and a metal substrate, and the light source assembly rotates at a high speed around a normal rotation axis a light-emitting surface, wherein the rotation frequency of the light source assembly is not lower than a visually recognizable frequency.

The ADB function adjustment method for a vehicle light of the invention is characterized in that the movement frequency of the LED light-emitting chip is 50-500 HTz, and the on-off frequency of the LED light-emitting chip is 1000-50000 HTz.

The ADB function adjustment method for a vehicle light of the invention is characterized in that the displacement frequency of the light source with respect to the lens is greater than the number of visually recognizable frames, and is specifically greater than 30 frames per second.

The ADB function adjustment method for a vehicle light of the invention is characterized in that an intelligent illumination light control system comprising a PBS, a camera CMOS chip and an imaging lens group is disposed on a front light-emitting side of a lens or lens group corresponding to the light source to carry out ADB function adjustment on a vehicle light;

The intelligent illumination light control system comprises an LCD, an LCOS chip or a DMD chip arranged on the PBS and opposite to the lens, wherein the LCD, the LCOS chip and the DMD chip realizes a dark area through a liquid crystal technique, a reflective liquid crystal technique and a micromirror wafer technique, respectively;

One part of light rays emitted by the intelligent illumination light control system penetrate through the PBS and are irradiated on the imaging lens group to finally form an illumination light shape;

The other part of the light rays emitted by the intelligent illumination light control system are reflected by the PBS in a direction opposite to the camera CMOS chip, so that light emitted by an illumination system is prevented from being irradiated onto the CMOS chip, which may otherwise disturb the CMOS chip;

Ambient light enters the imaging lens group in a direction opposite to an illumination light path;

One part of the ambient light is reflected by the PBS to a photosensitive chip integrated circuit to form an information source, a light signal is converted into an electric signal by the CMOS chip of the photosensitive chip integrated circuit, and a computing system analyzes the electric signal to draw a conclusion; an operation result is transmitted to an execution system of a control circuit board including the LCD, the LCOS chip and the DMD chip; after the operation result is analyzed and processed, information about vehicles and pedestrians on the road is determined; and the intelligent illumination light control system is controlled to carry out ADB function adjustment and control.

The ADB function adjustment method for a vehicle light of the invention is characterized in that the PBS is arranged on a focal point or a focal plane of the imaging lens group, and a camera shares one lens group with the vehicle light, the intelligent illumination light control system and the PBS.

The ADB function adjustment method for a vehicle light of the invention is characterized in that the light source comprises multiple LED light-emitting chips that can be defocused forward or backward by 0-5 mm with respect to the focal point of the lens or lens group corresponding to the light source to realize multi-dimensional ADB function adjustment.

A vehicle light with an ADB function is characterized in that Lambertian-like divergent light rays emitted by an LED light source are collimated by an optical lens to form illumination light rays nearly in parallel, the illumination light rays form a primary light spot and a primary light shape thereof on a front vertical screen, and the primary light shape is a primary intensive light spot formed around the primary light spot;

The light source is transversely displaced with respect to the lens to form a secondary spot light and a continuous secondary light shape thereof;

A high-beam illumination light shape is formed by dynamic superposition of the primary light shape and the secondary light shape, wherein the dynamic superposition of the primary light shape and the secondary light shape includes superposition of shape changes or position changes of the light shapes.

The vehicle light with an ADB function of the invention is characterized in that the light source is switched off when moving to a certain position in each cycle, and is in an on state in the other positions, such that a light shape having a dark area is formed on the front vertical screen corresponding to the switched-off position, thereby realizing an ADB function;

That is, a local dark area is formed by recombination of dynamically moving light shapes and fast on-off of the light source to realize the ADB function.

The vehicle light with an ADB function of the invention is characterized in that an intelligent illumination light control system comprising a PBS, a camera CMOS chip and an imaging lens group is disposed on a front light-emitting side of a lens or lens group corresponding to the light source to carry out ADB function adjustment on the vehicle light;

The intelligent illumination light control system comprises an LCD, an LCOS chip or a DMD chip arranged on the PBS and opposite to the lens;

One part of light rays emitted by the intelligent illumination light control system penetrate through the PBS and are irradiated on the imaging lens group to finally form an illumination light shape;

The other part of the light rays emitted by the intelligent illumination light control system are reflected by the PBS in a direction opposite to the camera CMOS chip, so that light emitted by an illumination system is prevented from being irradiated onto the CMOS chip, which may otherwise disturb the CMOS chip;

Ambient light enters the imaging lens group in a direction opposite to an illumination light path;

One part of the ambient light is reflected by the PBS to a photosensitive chip integrated circuit to form an information source, a light signal is converted into an electric signal by the CMOS chip of the photosensitive chip integrated circuit, and a computing system analyzes the electric signal to draw a conclusion; an operation result is transmitted to an execution system of a control circuit board including the LCD, the LCOS chip and the DMD chip; after the operation result is analyzed and processed, information about vehicles and pedestrians on the road is determined; and the intelligent illumination light control system is controlled to carry out ADB function adjustment and control.

The vehicle light with an ADB function of the invention is characterized in that the dark area includes a transitional dark area formed in the moving process of the light source and located between the primary light source and the dark area formed when the light source moves to the switched-off position, namely a low-brightness transitional area and a real dark area corresponding to the displacement of the light source.

The vehicle light with an ADB function of the invention is characterized in that a secondary light distribution component is additionally disposed between the light source and the lens to change the primary light shape in shape and position.

The vehicle light with an ADB function of the invention is characterized in that the light source quickly and linearly reciprocates in a transverse area to form a continuous illumination light shape.

The vehicle light with an ADB function of the invention is characterized in that a rotary light source device is used to enable the light source to quickly and linearly reciprocate with respect to the lens.

The vehicle light with an ADB function of the invention is characterized in that a rotary light source system includes a light source assembly composed of an LED light-emitting chip and a metal substrate, and the light source assembly rotates at a high speed around a normal rotation axis of a light-emitting surface, wherein the rotation frequency of the light source assembly is not lower than a visually recognizable frequency.

The vehicle light with an ADB function of the invention is characterized in that the movement frequency of LED light-emitting chip is 50-500 HTz, and the on-off frequency of the LED light-emitting chip is 1000-50000 HTz.

The vehicle light with an ADB function of the invention is characterized in that the movement frequency of LED light-emitting chip is 50 HTz, and the on-off frequency of the LED light-emitting chip is 1000 HTz; and the rotary light source is switched on or off every one millisecond to realize a 0.5° transitional dark area around a real dark area, namely a low-brightness transitional area, and the real dark area formed when the light source is switched off within one millisecond.

The vehicle light with an ADB function of the invention is characterized in that the displacement frequency of the light source with respect to the lens is greater than the number of visually recognizable frames, and is generally greater than 30 frames per second.

The vehicle light with an ADB function of the invention is characterized in that the light source comprises multiple LED light-emitting chips that can be defocused forward or backward by 0-5 mm with respect to the focal point of the lens or lens group of corresponding to light source to realize multi-dimensional ADB function adjustment.

The LED light-emitting chips are multiple LED light-emitting chips, and gaps between the multiple LED light-emitting chips are 0.1 mm-0.5 mm.

A rotary motor drives a movement mechanism to enable the light source to be defocused forward or backwards with respect to the lens or the lens group by 0-5 mm.

Preferably, the light-emitting chips are rectangular light-emitting chips and square light-emitting chips.

The rectangular light-emitting chips are 1 mm*1-5 mm rectangular light-emitting chips, and the square light-emitting chips are 1-5 mm*1-5 mm light-emitting chips.

According to the invention, the change of the light shape may be a shape change, a position change or a synchronous change in shape and position. Different from traditional static vehicle light functions, the invention realizes a vehicle light function by means of a superposed light shape formed by a dynamic and quick change of the light shape, and has the following advantages:

1. A large illumination area, such as the light shape shown in FIG. 2 and the illumination area shown in FIG. 4, can be realized by means of a few LED light-emitting chips.

2. Control of the light energy distribution can be realized by dynamic superposition of light shapes. For example, ideal high-beam illumination light shapes with the brightness becoming dark gradually from the center shown in FIG. 6-FIG. 12 can be realized.

3. The uniformity of light shapes is improved, and the uniformity of non-uniform illumination light shapes is improved by a dynamic change and superposition.

More specially, compared with an existing ADB function realized by multiple LED light-emitting chips arranged in a matrix and static switching-off, the invention has the following advantages:

1. A smaller dark area can be realized, and the control precision of an ADB can be significantly improved.

2. The number of LED light-emitting chips can be greatly reduced, and ADB function adjustment can be realized by a single LED light-emitting chip.

3. A matrix light shape can be formed by means of joint control of multiple chips that are arranged in a matrix and are separately controlled to be switched on or off, as shown in FIG. 15 and FIG. 16.

In the figures: 1, LED light source; 2, lens or lens group corresponding to the light source; 3, secondary light distribution component; 4, imaging lens group; 5, PBS; 6, camera CMOS chip; 7, LCD, LCOS chip or DMD chip arranged on the PBS and opposite to the lens group of the PBS and used to form a dark area; 8, real dark area; 9, transitional dark area; S, movement speed of light shape.

DETAILED DESCRIPTION OF THE INVENTION

Figure 1:
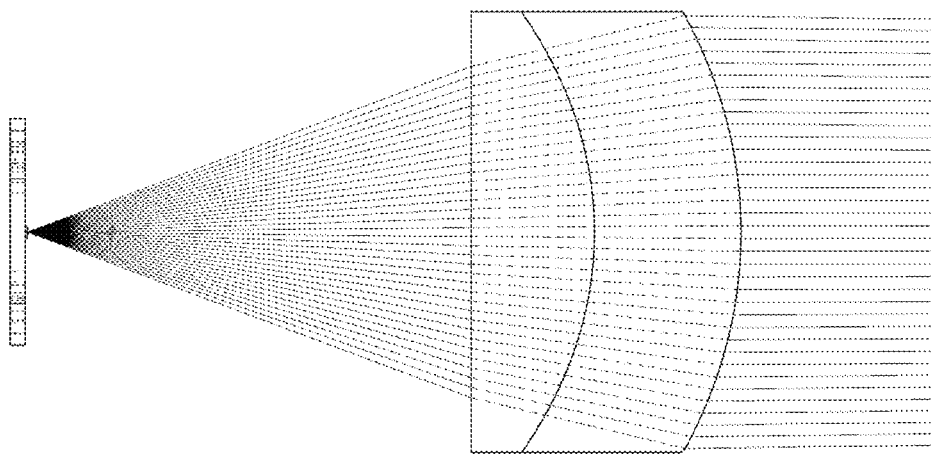
FIG. 1 is a schematic diagram of a light path of a novel vehicle light system of the invention.
Figure 2:
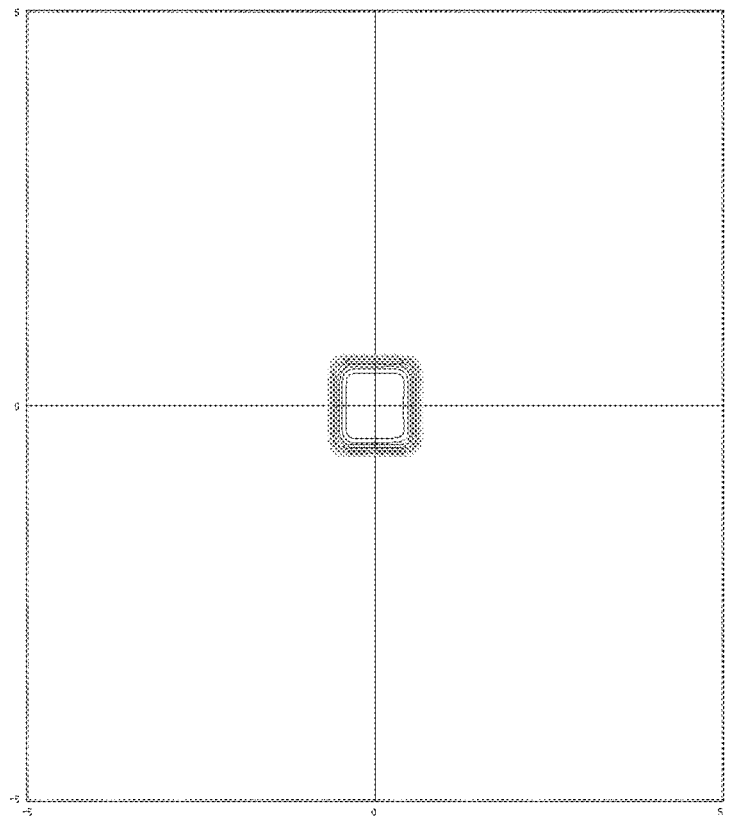
FIG. 2 is one schematic diagram of a light shape formed on a screen corresponding to the focal point of a square LED light-emitting chip of the invention.

As shown in FIG. 1, Lambertian-like divergent light rays emitted by an LED light source are collimated by an optical lens to form illumination light rays nearly in parallel, and a light shape is formed on a vertical screen 25 m in front, as show in FIG. 2. The light shape is an upper, lower, left or right intensive light spot of about 0.5°, the size of the light spot depends on the light-emitting area and shape of the light source and the form of a lens, such as a lens or lens group corresponding to the light source or a unidirectional-diffusion lens.

Figure 3:
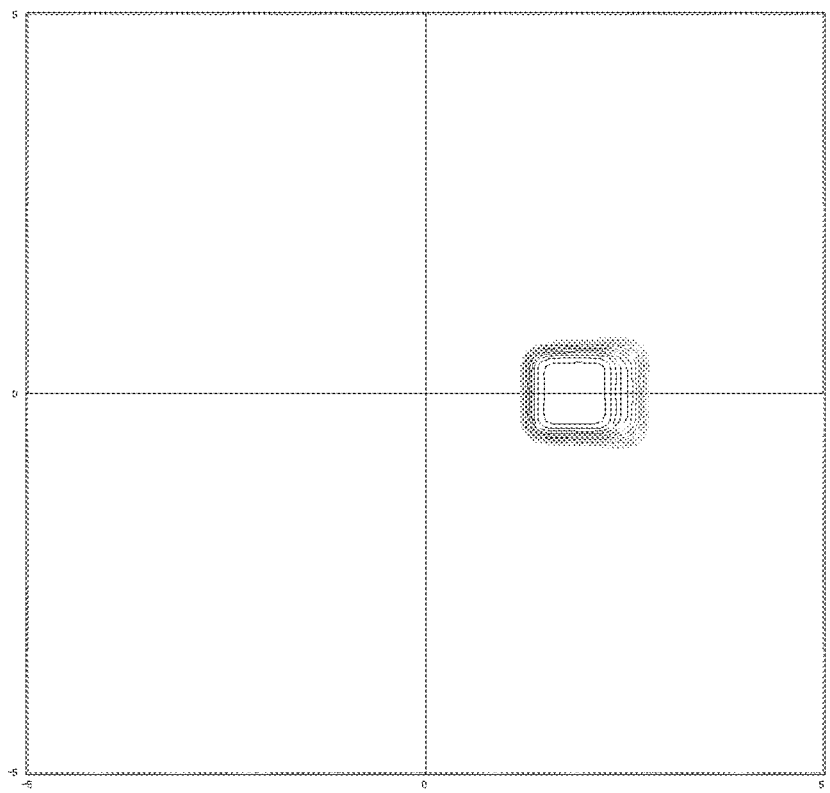
FIG. 3 is a schematic diagram of a light shape formed on the screen when the square LED light-emitting chip is transversely displaced of the invention.
Figure 4:
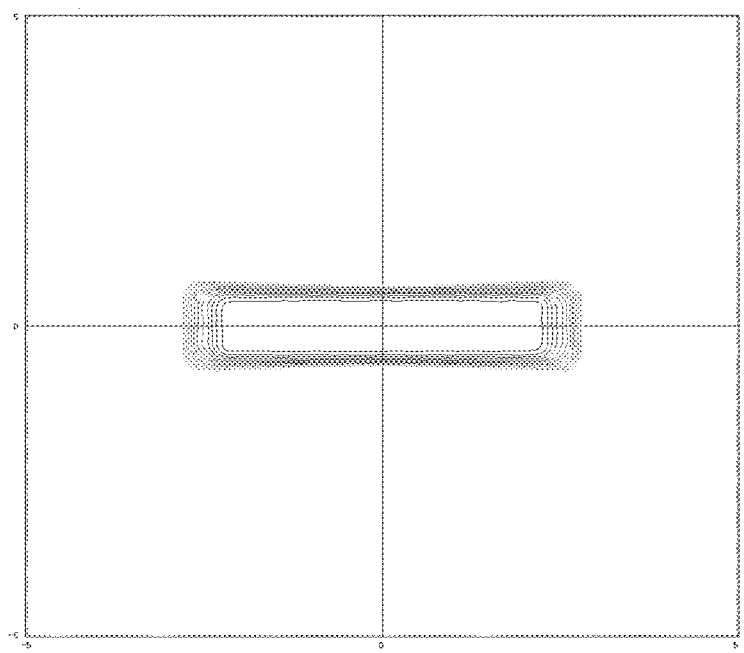
FIG. 4 is a schematic diagram of a light shape formed on the screen when the square LED light-emitting chip transversely and quickly reciprocates of the invention.
Figure 5:
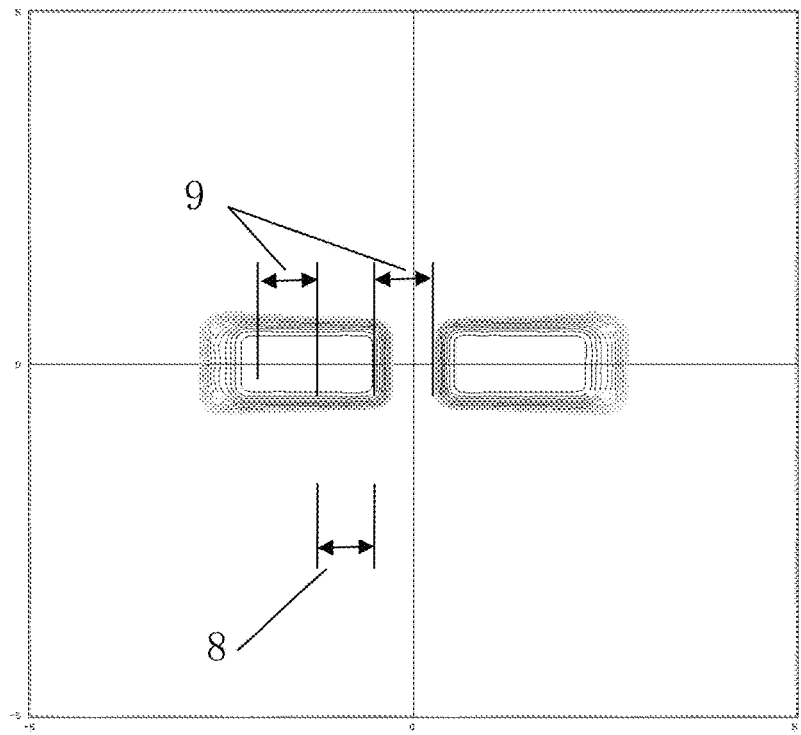
FIG. 5 is a schematic diagram of a light shape formed on the screen by superposition of light shapes formed when the rectangular LED light-emitting chip quickly reciprocates, and a partial area is switched off of the invention.
Figure 6:
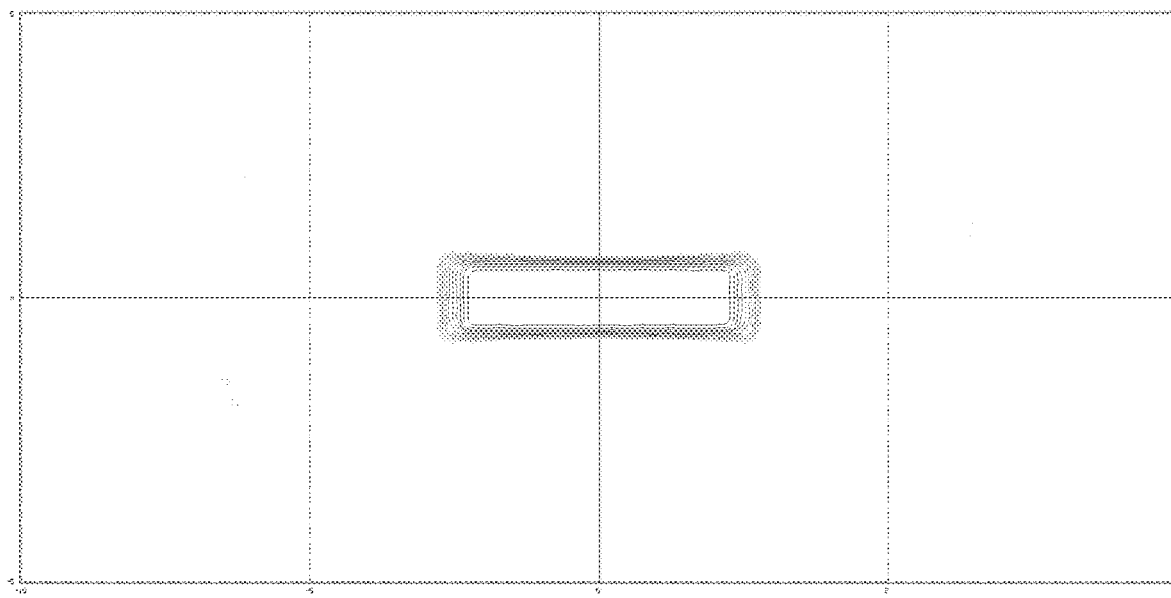
FIG. 6 is a schematic diagram of a light shape formed on a screen corresponding to the focal point of a rectangular LED light-emitting chip of the invention.
Figure 7:
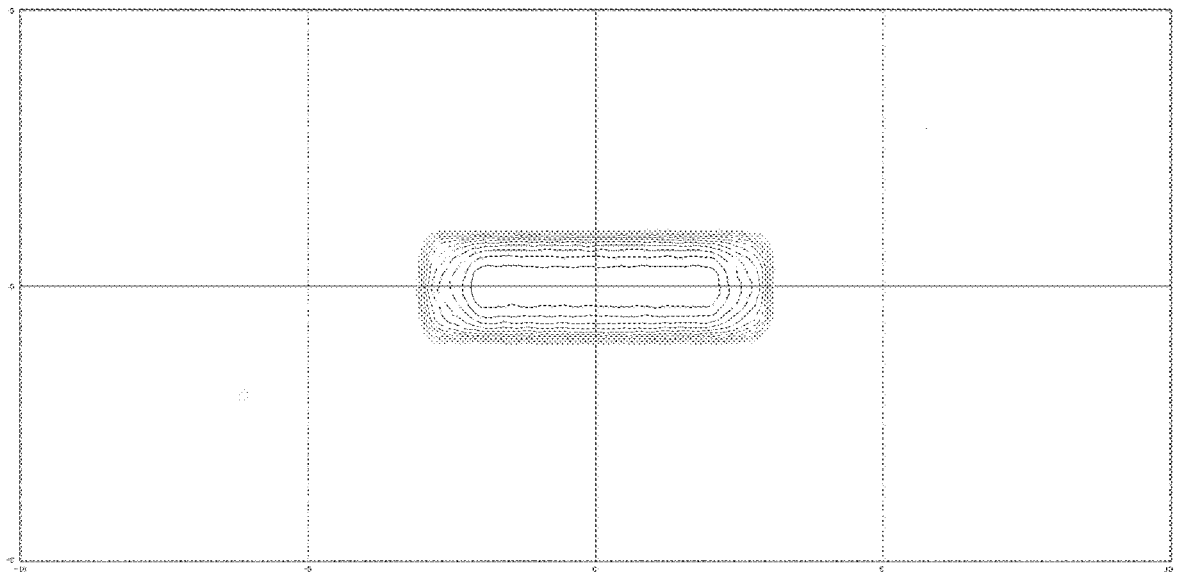
FIG. 7 is a schematic diagram of a light shape formed on the screen when the rectangular LED light-emitting chip is defocused forward or backward by 1 mm of the invention.
Figure 8:
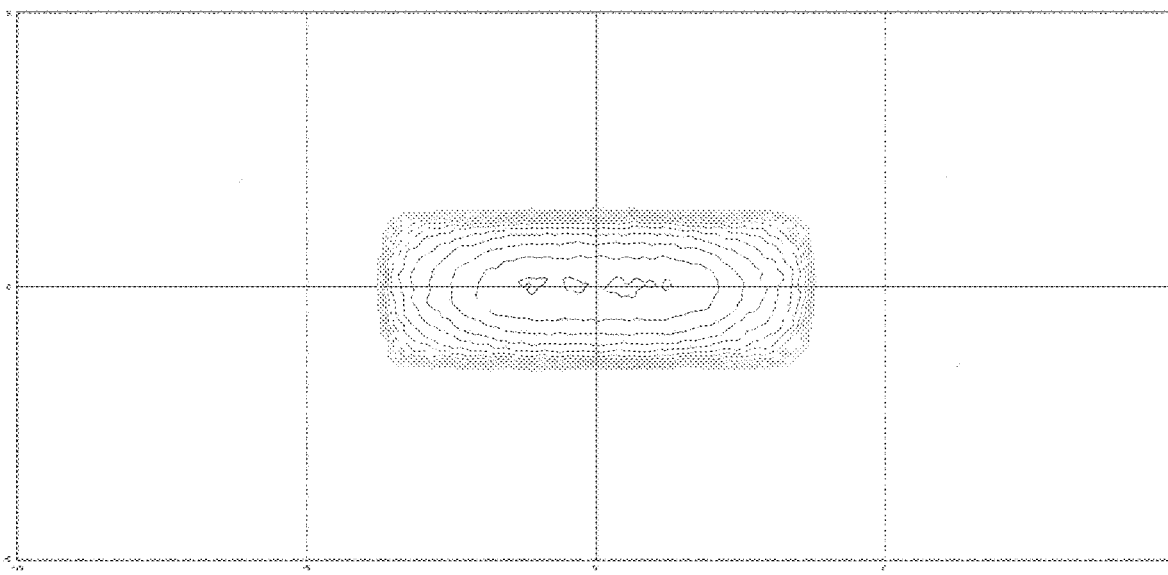
FIG. 8 is a schematic diagram of a light shape formed on the screen when the rectangular LED light-emitting chip is defocused forward or backward by 2 mm of the invention.
Figure 9:
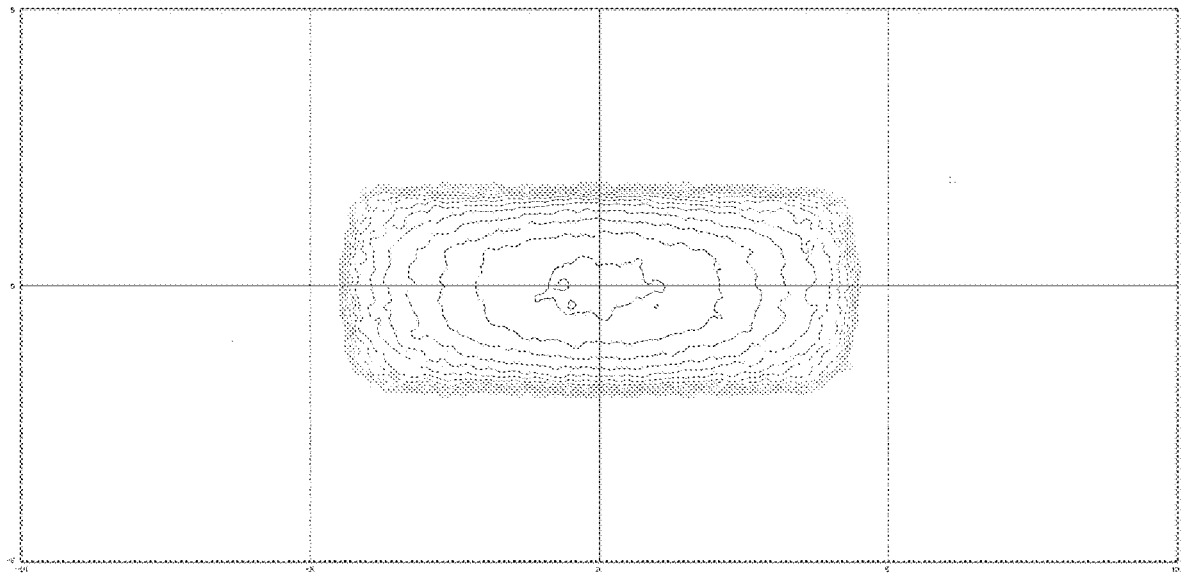
FIG. 9 is a schematic diagram of a light shape formed on the screen when the rectangular LED light-emitting chip is defocused forward or backward by 3 mm of the invention.
Figure 10:
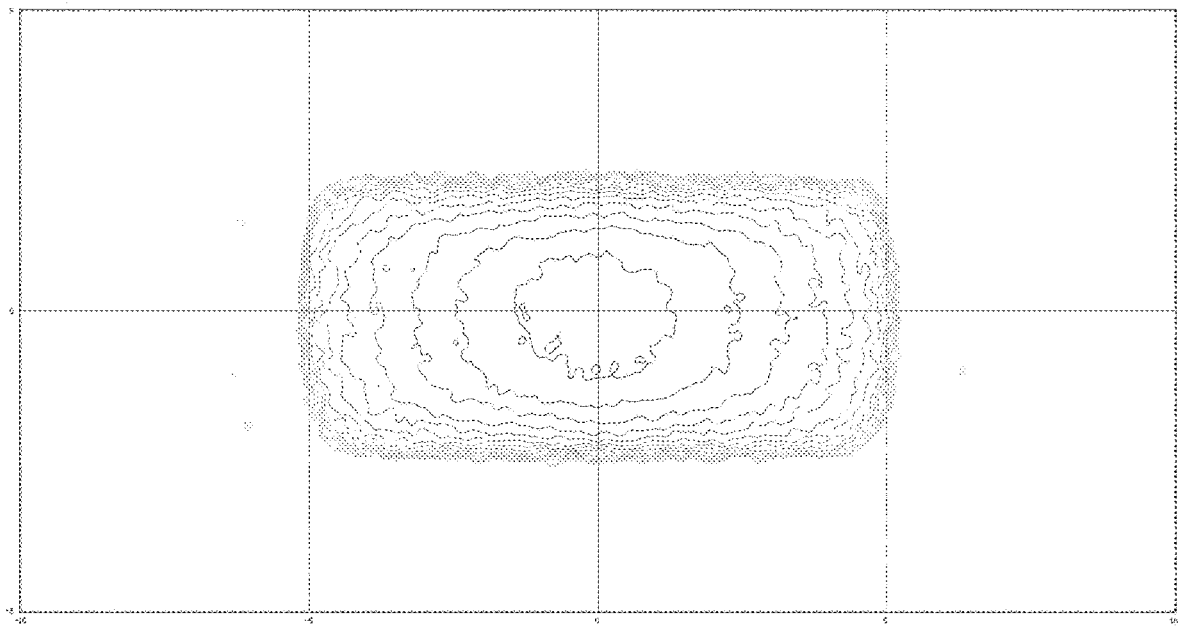
FIG. 10 is a schematic diagram of a light shape formed on the screen when the rectangular LED light-emitting chip is defocused forward or backward by 4 mm of the invention.
Figure 11:
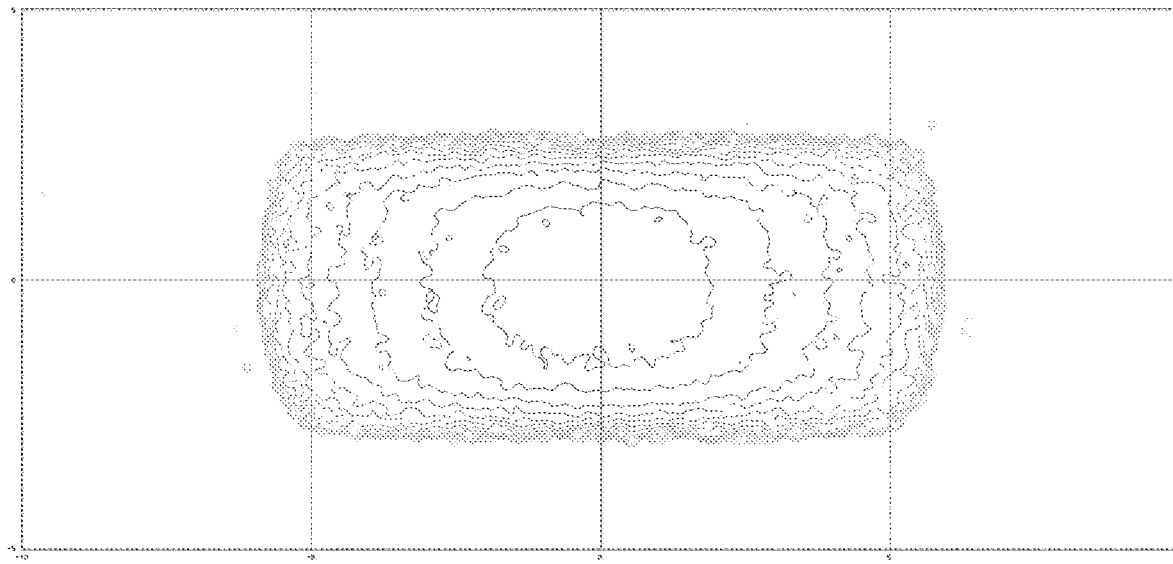
FIG. 11 is a schematic diagram of a light shape formed on the screen when the rectangular LED light-emitting chip is defocused forward or backward by 5 mm of the invention.

FIG. 2 and FIG. 3 are schematic diagrams of a light shape formed when a square LED light-emitting chip transversely reciprocate at or near the focal point of the lens or lens group corresponding to the light source, FIG. 4 is a schematic diagram of a superposed light shape formed when the square LED light-emitting chip transversely and quickly reciprocates at or near the focal point of the lens or lens group corresponding to the light source, FIG. 5 illustrates a light shape having a dark area and capable of realizing an ADB function, and FIG. 6-FIG. 16 illustrate matrix light shapes formed by means of joint control of multiple chips that are arranged in a matrix and are separately controlled to be switched on or off.

As shown in FIG. 2, a secondary light distribution component may be additionally arranged between the light source and the lens to change the light shape. Then, the light shape is transversely displaced with respect to the lens to form a light spot shown in FIG. 3. Furthermore, the light source quickly and linearly reciprocates in a certain transverse area to form a continuous illumination light shape shown in FIG. 4, and on this basis, the light source is switched off when moving to a certain position, and is in an on state in the other positions to form a light shape having a dark area shown in FIG. 5, thereby realizing an ADB function.

FIG. 2 to FIG. 4 illustrate a method for realizing a vehicle light function by a quick change of the position of a light shape and superposition of light shapes. FIG. 2 and FIG. 3 are schematic diagrams of light shapes formed when a square LED light-emitting chip transversely reciprocate at or near the focal point of the lens or lens group corresponding to the light source. FIG. 4 is a schematic diagram of a superposed light shape formed by when square LED light-emitting chip transversely and quickly reciprocates at or near the focal point corresponding to the light source.

Figure 12:
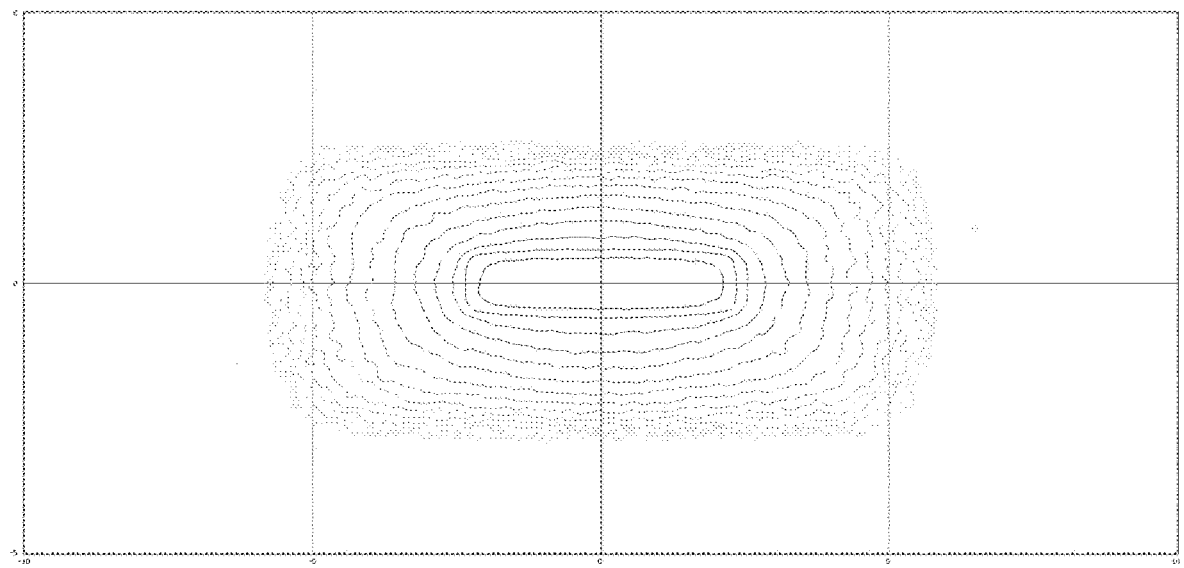
FIG. 12 is a schematic diagram of a superposed light shape formed on the screen by superposition of light shapes formed when the rectangular LED light-emitting chip quickly reciprocates forward or backward of the invention.

FIG. 5 is a schematic diagram of a light shape having a dark area formed when the LED light-emitting chip is quickly switched off at a certain position and used for realizing an ADB function. FIG. 6-FIG. 11 are schematic diagrams of light shapes formed when the LED light-emitting chip moves forward or backward near the focal point of the lens or lens group corresponding to the light source. FIG. 12 is a schematic diagram of a superposed light shape.

According to the above description, the vehicle light function is realized by a quick change and superposition of light shapes. The frequency of the quick change is greater than the number of visually recognizable frames, and is generally greater than 30 frames per second. The quick change of the light shapes can be realized by means of relative displacement of the light source with respect to an optical device for forming the light shape, such as a reflector or a transparent optical conductor.

Figure 13:
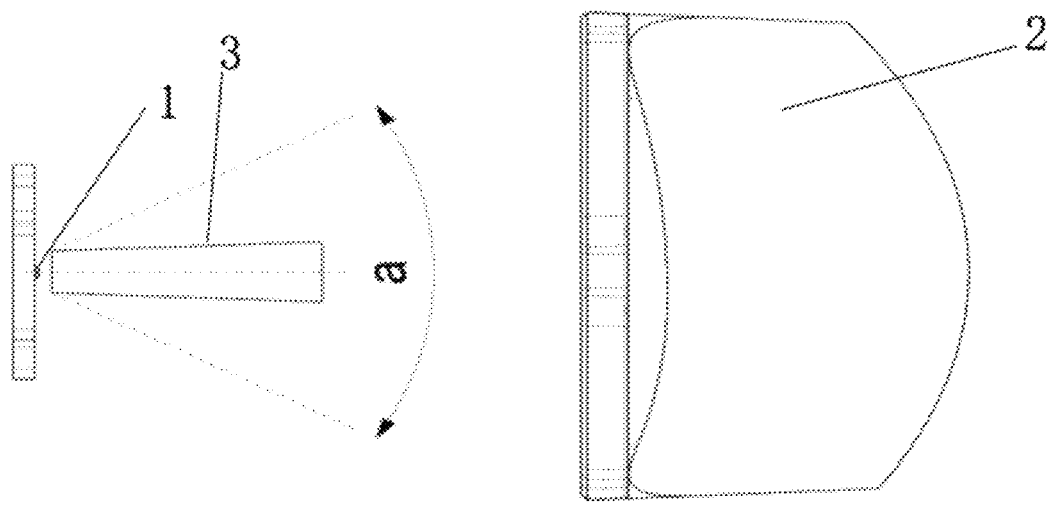
FIG. 13-FIG. 16 illustrate a matrix light shape formed by means of joint control of multiple chip that are arranged in a matrix and are separately controlled to be switched on or off, wherein a is an angle range of periodic swing of a transparent optical conductor for a periodic change of the light shape.
Figure 14:
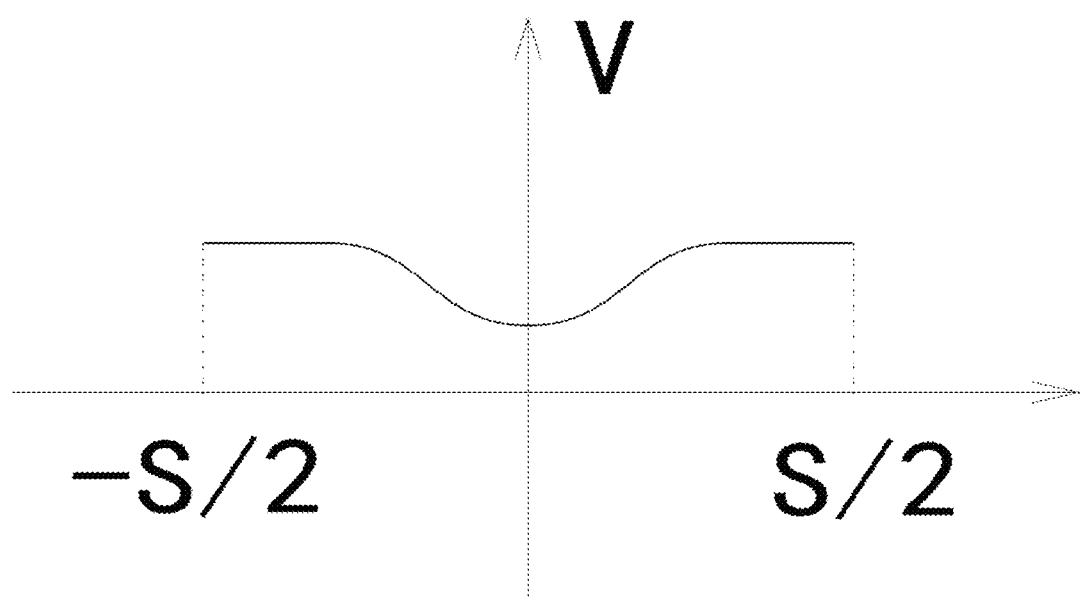

As shown in FIG. 13, the change of the light shape can be realized by quick and repeated rotation of the transparent optical conductor within a certain angle range.

As shown in FIG. 2, because the primary light shape has a certain width (a light spot of about 0.5° herein), according to the movement rule of the light spot, a completely dark area can be formed when the light source corresponding to light spot is switched off in a real dark area, and there is a transitional dark area on each of the two sides of the completely dark area when the light source corresponding to the light spot moves out of the real dark area and is switched on.

The width of the middle dark area shown in FIG. 5 depends on the movement speed S of the light shape and the on-off frequency. Assume the width of the light spot is 0.5°, the center of the light spot moves leftward and rightward by 2.5° to obtain the light shape of about 5.5° in FIG. 4.

Assume the light spot linearly reciprocates at a constant speed and a frequency of 50 HTz, it can be obtained by calculation that the movement cycle is 20 ms, and the movement speed is 0.5°/ms. Assume the on-off frequency of the LED light-emitting chip is 1000 HTz, that is, the LED light-emitting chip is switched on or off every 1 ms, a 0.5° dark area can be realized from the moment the LED light-emitting chip is switched off to the moment the LED light-emitting chip is switched on. The on-off frequency of existing control chip may reach tens of thousands of hertz.

Figure 15:
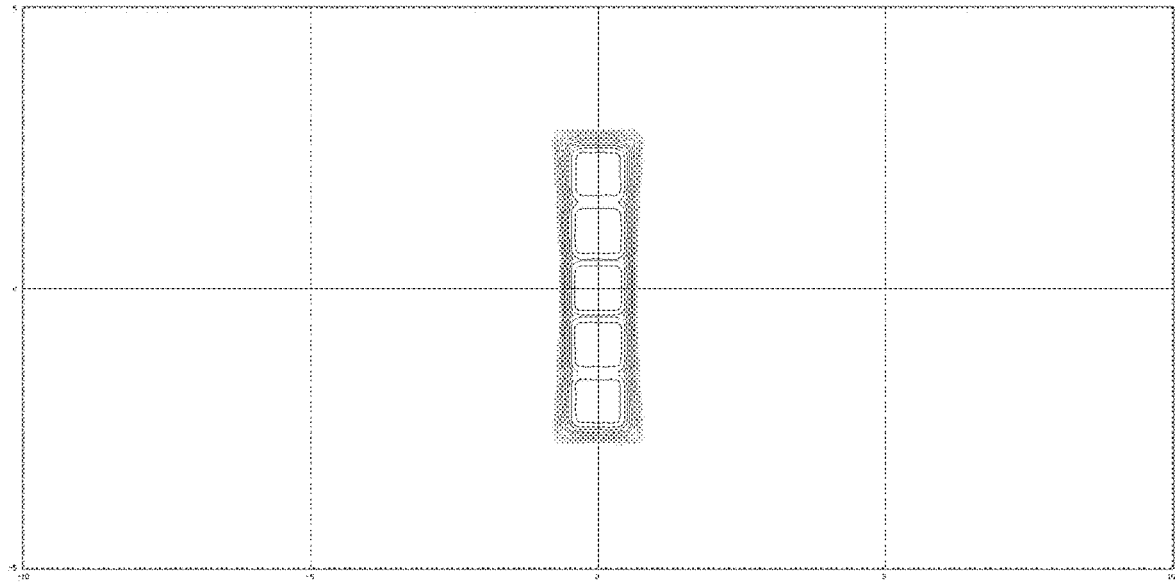
Figure 16:
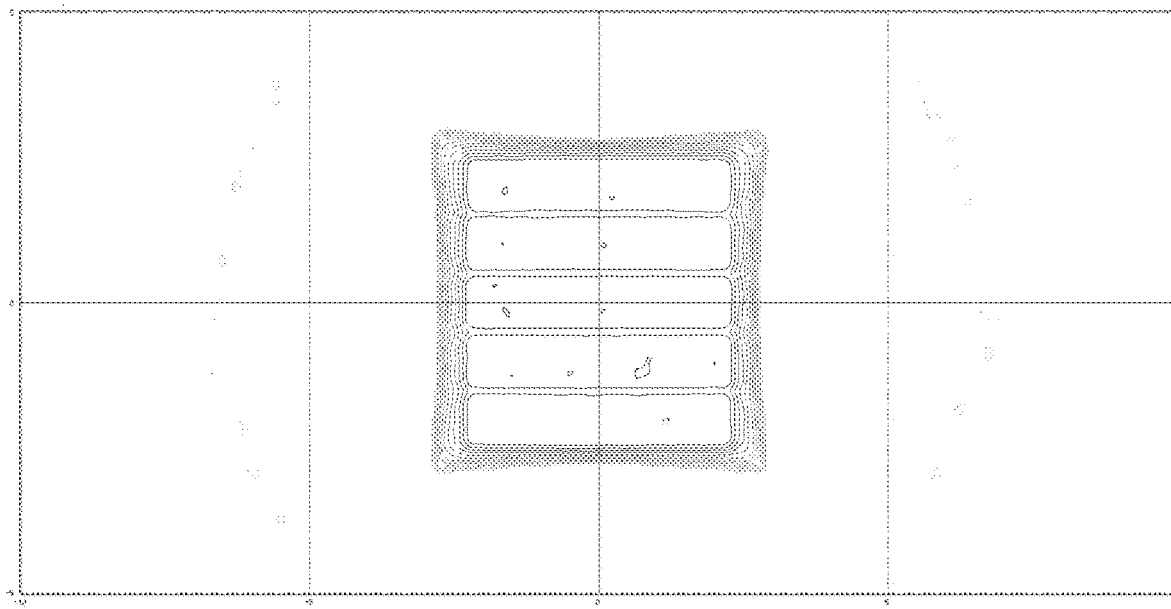
Figure 17:
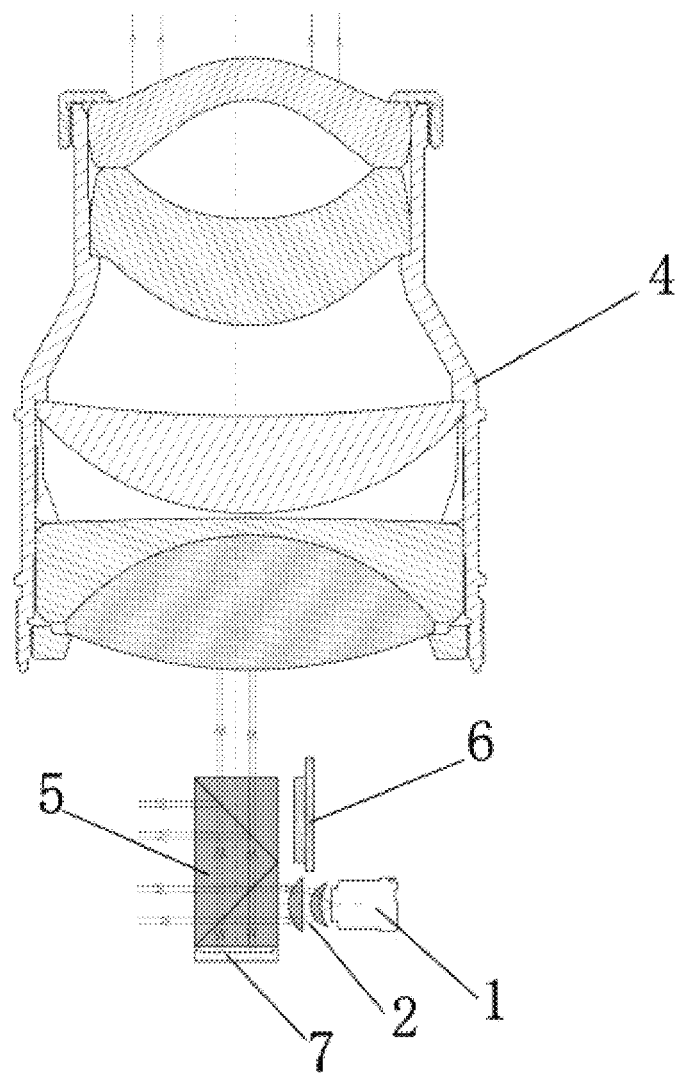
FIG. 17 is a schematic diagram of a camera-integrated intelligent vehicle light module of the invention.
Figure 18:
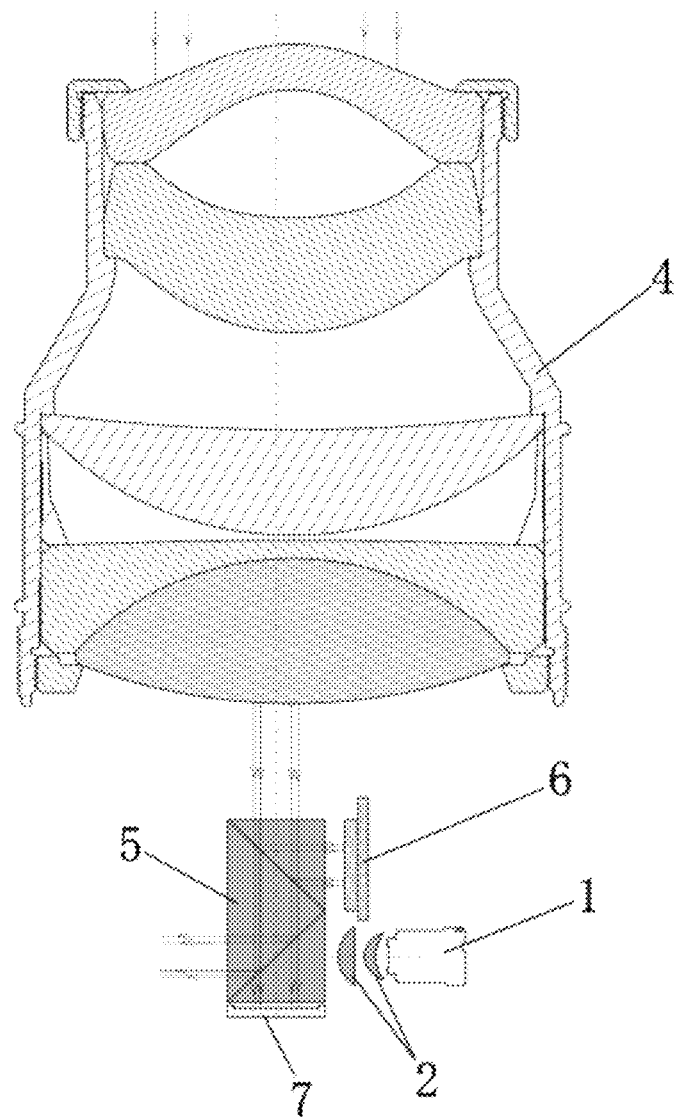
FIG. 18 is a schematic diagram of an ambient light path of the camera-integrated intelligent vehicle light module of the invention.

As shown in FIG. 15, according to the ADB method provided by the invention, under the condition where the on-off frequency has been determined, the size of the local dark area can be adjusted by controlling the distribution of the movement speed of the light spot within the movement cycle. For example, if the size of the dark area needs to be reduced at the center position, which can be achieved by reducing the speed when the light spot passes through the center position, but the period remains unchanged.

According to the ADB method provided by the invention, under the condition where the movement cycle and speed of the light spot are determined, the size of the dark area can be adjusted by controlling the on-off frequency of the LED chip.

To sum up, a minimum dark area provided by the ADB system of the invention is not directly associated with the size of the light spot and is associated with the movement speed of the light spot and the on-off frequency of the LED chip. While the size of a dark area formed by traditional technical solutions is directly associated with the light spot, so the number of LED chips has to be continuously increased and the width of the spot light can be continuously decreased to decease the width of the dark area.

Different from traditional static vehicle light functions, the invention realizes a vehicle light function by means of a superposed light shape formed by a dynamic and quick change of a light shape.

According to the invention, a large illumination area can be realized by means of a few LED light-emitting chips, control of the light energy distribution can be realized by dynamic superposition of light shapes, an ideal high-beam illumination light shape with the brightness becoming dark gradually from the center shown can be realized, and the uniformity of non-uniform illumination light shapes can be improved by a dynamic change and superposition.

According to the invention, compared with an existing ADB function realized by multiple LED light-emitting chips arranged in a matrix and static switching-off, A smaller dark area can be realized, and the control precision of an ADB can be significantly improved.

According to the invention, A matrix light shape can be formed by means of joint control of multiple chips that are arranged in a matrix and are separately controlled to be switched on or off.

According to the invention, multiple LED light-emitting chips are adopted, and forward or backward defocusing with respect to the focal point of the lens or the lens group is carried out to realize multi-dimensional ADB function adjustment, that is, ADB function control is carried out for upper, lower, left and right objects in front of a vehicle light by different distances.

What is claimed is:

1. An ADB function adjustment method for a vehicle light, characterized in that:
   a superposed illumination light shape is formed by a periodic high-speed change of a light shape, and the periodic high-speed change of the light shape is a shape change, that is, dynamic superposition of light shapes, or a position change or a synchronous change in shape and position;
   a light source is quickly switched off in conjunction with the periodic change of the light shape to generate one or more local dark areas, thereby realizing an ADB function;
   Lambertian-like divergent light rays emitted by the LED light source are collimated by an optical lens and are then irradiated to form illumination light rays nearly in parallel, the illumination light rays form a primary light spot and a primary light shape thereof on a front vertical screen, and the primary light shape is a primary intensive light spot formed around the primary light spot;
   the light source is transversely displaced with respect to the lens to form a secondary spot light and a continuous secondary light shape thereof;
   a high-beam illumination light shape is formed by dynamic superposition of the primary light shape and the secondary light shape, wherein the dynamic superposition of the primary light shape and the secondary light shape includes superposition of shape changes or position changes of the light shapes;
   the light source quickly and linearly reciprocates in a transverse area to form a continuous illumination light shape.

2. The ADB function adjustment method for a vehicle light according to claim 1, wherein the light source is switched off when moving to a certain position in each cycle, and is in an on state in other positions, such that a light shape having a dark area is formed on the front vertical screen corresponding to a switched-off position, thereby realizing the ADB function;
   that is, a local dark area is formed by recombination of dynamically moving light shapes and fast on-off of the light source to realize the ADB function.

3. The ADB function adjustment method for a vehicle light according to claim 2, wherein the dark area includes a transitional dark area formed in a moving process of the light source and located between the primary light source and the dark area formed when the light source moves to the switched-off position, namely a low-brightness transitional area, and a real dark area corresponding to the displacement of the light source.

4. The ADB function adjustment method for a vehicle light according to claim 1, wherein a secondary light distribution component is additionally disposed between the light source and the lens to change the primary light shape in shape and position.

5. The ADB function adjustment method for a vehicle light according to claim 1, wherein a rotary light source device is used to enable the light source to quickly and linearly reciprocate with respect to the lens.

6. The ADB function adjustment method for a vehicle light according to claim 1, wherein a rotary light source system includes a light source assembly composed of an LED light-emitting chip and a metal substrate, and the light source assembly rotates at a high speed around a normal rotation axis of a light-emitting surface, and a rotation frequency of the light source assembly is not lower than a visually recognizable frequency.

7. The ADB function adjustment method for a vehicle light according to claim 2, wherein a movement frequency of an LED light-emitting chip is 50-500 HTz, and an on-off frequency of the LED light-emitting chip is 1000-50000 HTz.

8. The ADB function adjustment method for a vehicle light according to claim 1 or 2, wherein a displacement frequency of the light source with respect to the lens is greater than the number of visually recognizable frames, and is specifically greater than 30 frames per second.

9. The ADB function adjustment method for a vehicle light according to claim 1, wherein an intelligent illumination light control system comprising a PBS, a camera CMOS chip and an imaging lens group is disposed on a front light-emitting side of a lens or lens group corresponding to the light source to carry out ADB function adjustment on a vehicle light;
   the intelligent illumination light control system comprises an LCD, an LCOS chip or a DMD chip arranged on the PBS and opposite to the lens, wherein the LCD, the LCOS chip and the DMD chip realizes a dark area through a liquid crystal technique, a reflective liquid crystal technique and a micromirror wafer technique, respectively;
   one part of light rays emitted by the intelligent illumination light control system penetrate through the PBS and are irradiated on the imaging lens group to finally form an illumination light shape;
   another part of the light rays emitted by the intelligent illumination light control system are reflected by the PBS in a direction opposite to the camera CMOS chip, so that light emitted by an illumination system is prevented from being irradiated onto the CMOS chip, which may otherwise disturb the CMOS chip;
   ambient light enters the imaging lens group in a direction opposite to an illumination light path;
   one part of the ambient light is reflected by the PBS to a photosensitive chip integrated circuit to form an information source, a light signal is converted into an electric signal by the CMOS chip of the photosensitive chip integrated circuit, and a computing system analyzes the electric signal to draw a conclusion; an operation result is transmitted to an execution system of a control circuit board including the LCD, the LCOS chip and the DMD chip; after the operation result is analyzed and processed, information about vehicles and pedestrians on a road is determined; and the intelligent illumination light control system is controlled to carry out ADB function adjustment and control.

10. The ADB function adjustment method for a vehicle light according to claim 9, wherein the PBS is arranged on a focal point or a focal plane of the imaging lens group, and a camera shares one lens group with the vehicle light, the intelligent illumination light control system and the PBS.

11. The ADB function adjustment method for a vehicle light according to claim 1, wherein the light source comprises multiple LED light-emitting chips that can be defocused forward or backward by 0-5 mm with respect to the focal point of the lens or lens group corresponding to the light source to realize multi-dimensional ADB function adjustment.

12. A vehicle light with an ADB function, characterized in that Lambertian-like divergent light rays emitted by an LED light source are collimated by an optical lens to form illumination light rays nearly in parallel, the illumination light rays form a primary light spot and a primary light shape thereof on a front vertical screen, and the primary light shape is a primary intensive light spot formed around the primary light spot;
the light source is transversely displaced with respect to the lens to form a secondary spot light and a continuous secondary light shape thereof;
a high-beam illumination light shape is formed by dynamic superposition of the primary light shape and the secondary light shape, wherein the dynamic superposition of the primary light shape and the secondary light shape includes superposition of shape changes or position changes of the light shapes;
the light source quickly and linearly reciprocates in a transverse area to form a continuous illumination light shape.

13. The vehicle light with an ADB function according to claim 12, wherein the light source is switched off when moving to a certain position in each cycle, and is in an on state in other positions, such that a light shape having a dark area is formed on the front vertical screen corresponding to the switched-off position, thereby realizing an ADB function;
that is, a local dark area is formed by recombination of dynamically moving light shapes and fast on-off of the light source to realize the ADB function.

14. The vehicle light with an ADB function according to claim 12, wherein:
an intelligent illumination light control system comprising a PBS, a camera CMOS chip and an imaging lens group is disposed on a front light-emitting side of a lens or lens group corresponding to the light source to carry out ADB function adjustment on the vehicle light;
the intelligent illumination light control system comprises an LCD, an LCOS chip or a DMD chip arranged on the PBS and opposite to the lens;
one part of light rays emitted by the intelligent illumination light control system penetrate through the PBS and are irradiated on the imaging lens group to finally form an illumination light shape;
another part of the light rays emitted by the intelligent illumination light control system are reflected by the PBS in a direction opposite to the camera CMOS chip, so that light emitted by an illumination system is prevented from being irradiated onto the CMOS chip, which may otherwise disturb the CMOS chip;
ambient light enters the imaging lens group in a direction opposite to an illumination light path;
another part of the ambient light is reflected by the PBS to a photosensitive chip integrated circuit to form an information source, a light signal is converted into an electric signal by the CMOS chip of the photosensitive chip integrated circuit, and a computing system analyzes the electric signal to draw a conclusion; an operation result is transmitted to an execution system of a control circuit board including the LCD, the LCOS chip and the DMD chip; after the operation result is analyzed and processed, information about vehicles and pedestrians on a road is determined; and the intelligent illumination light control system is controlled to carry out ADB function adjustment and control.

15. The vehicle light with an ADB function according to claim 12 or 14, wherein the dark area includes a transitional dark area formed in the moving process of the light source and located between the primary light source and the dark area formed when the light source moves to the switched-off position, namely a low-brightness transitional area and a real dark area corresponding to the displacement of the light source.

16. The vehicle light with an ADB function according to claim 12 or 14, wherein a secondary light distribution component is additionally disposed between the light source and the lens to change the primary light shape in shape and position.

17. The vehicle light with an ADB function according to claim 12, wherein a rotary light source device is used to enable the light source to quickly and linearly reciprocate with respect to the lens.

18. The vehicle light with an ADB function according to claim 17, wherein:
a rotary light source system includes a light source assembly composed of an LED light-emitting chip and a metal substrate, and the light source assembly rotates at a high speed around a normal rotation axis of a light-emitting surface, and a rotation frequency of the light source assembly is not lower than a visually recognizable frequency.

19. The vehicle light with an ADB function according to claim 2, wherein the movement frequency of an LED light-emitting chip is 50-500 HTz, and the on-off frequency of the LED light-emitting chip is 1000-50000 HTz.

20. The vehicle light with an ADB function according to claim 3, wherein a movement frequency of an LED light-emitting chip is 50 HTz, and an on-off frequency of the LED light-emitting chip is 1000 HTz; and a rotary light source is switched on or off every one millisecond to realize a 0.5° transitional dark area around a real dark area, namely a low-brightness transitional area, and the real dark area formed when the light source is switched off within one millisecond.

21. The vehicle light with an ADB function according to claim 2, wherein a displacement frequency of the light source with respect to the lens is greater than the number of visually recognizable frames, and is generally greater than 30 frames per second.

22. The vehicle light with an ADB function according to claim 2, wherein the light source comprises multiple LED light-emitting chips that can be defocused forward or backward by 0-5 mm with respect to a focal point of a lens or lens group corresponding to the light source to realize multi-dimensional ADB function adjustment.

\* \* \* \* \*